United States Patent
Ozawa et al.

(10) Patent No.: US 10,017,587 B2
(45) Date of Patent: Jul. 10, 2018

(54) PROCESS FOR PRODUCING (METH)ACRYLIC RESIN COMPOSITION

(71) Applicant: KURARAY Co., Ltd., Kurashiki-shi (JP)

(72) Inventors: Hiroshi Ozawa, Tainai (JP); Yasuhito Kitade, Tainai (JP); Shouji Tanaka, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 0 days.

(21) Appl. No.: 15/539,919

(22) PCT Filed: Dec. 25, 2015

(86) PCT No.: PCT/JP2015/086224
§ 371 (c)(1),
(2) Date: Jun. 26, 2017

(87) PCT Pub. No.: WO2016/104701
PCT Pub. Date: Jun. 30, 2016

(65) Prior Publication Data
US 2018/0009913 A1    Jan. 11, 2018

(30) Foreign Application Priority Data
Dec. 26, 2014  (JP) .................... 2014-264809

(51) Int. Cl.
*C08F 2/00* (2006.01)
*C08F 4/00* (2006.01)
(Continued)

(52) U.S. Cl.
CPC .................... *C08F 6/001* (2013.01)

(58) Field of Classification Search
CPC .................... C08F 6/001; C08F 2/38
(Continued)

(56) References Cited

U.S. PATENT DOCUMENTS

| 39,680,059 | | 7/1976 | Shimada et al. |
| 5,898,055 A | * | 4/1999 | Moriya .................. C08F 6/001 |
| | | | 526/224 |
| 2015/0191582 A1 | | 7/2015 | Ozawa et al. |

FOREIGN PATENT DOCUMENTS

| JP | 50-109278 A | 8/1975 |
| JP | 10-087705 A | 4/1998 |

(Continued)

OTHER PUBLICATIONS

International Search Report dated Mar. 8, 2016 in PCT/JP2015/086224, filed Dec. 25, 2015.

*Primary Examiner* — William K Cheung
(74) *Attorney, Agent, or Firm* — Oblon, McClelland, Maier & Neustadt, L.L.P.

(57) ABSTRACT

A method for producing a (meth)acrylic resin composition, the method comprising continuously feeding a polymerizable monomer component comprising 50 to 100% by mass of methyl methacrylate, 0 to 20% by mass of an acrylic acid alkyl ester and 0 to 30% by mass of an additional monomer, a chain transfer agent, and a radical polymerization initiator to a tank reactor; conducting bulk polymerization of the polymerizable monomer component at a polymerization conversion ratio of 40 to 70% by mass to obtain a liquid containing a (meth)acrylic resin; continuously feeding the liquid to a vented extruder to separate a volatile component from the (meth)acrylic resin; continuously feeding the separated volatile component to a distillation column to obtain a fraction containing methyl methacrylate; adding a polymerization inhibitor to the fraction; and reusing the fraction which contains the polymerization inhibitor as part of the polymerizable monomer component.

13 Claims, 2 Drawing Sheets

(51) Int. Cl.
*C08F 6/22* (2006.01)
*B01J 19/18* (2006.01)
*C08F 6/00* (2006.01)

(58) Field of Classification Search
USPC .......................... 526/224, 68; 528/492, 501
See application file for complete search history.

(56) References Cited

FOREIGN PATENT DOCUMENTS

| | | |
|---|---|---|
| JP | 10-087736 A | 4/1998 |
| JP | 10-182727 A | 7/1998 |
| JP | 2005-062887 | 3/2005 |
| WO | 2014/002504 A1 | 1/2014 |

\* cited by examiner

[FIG.1]
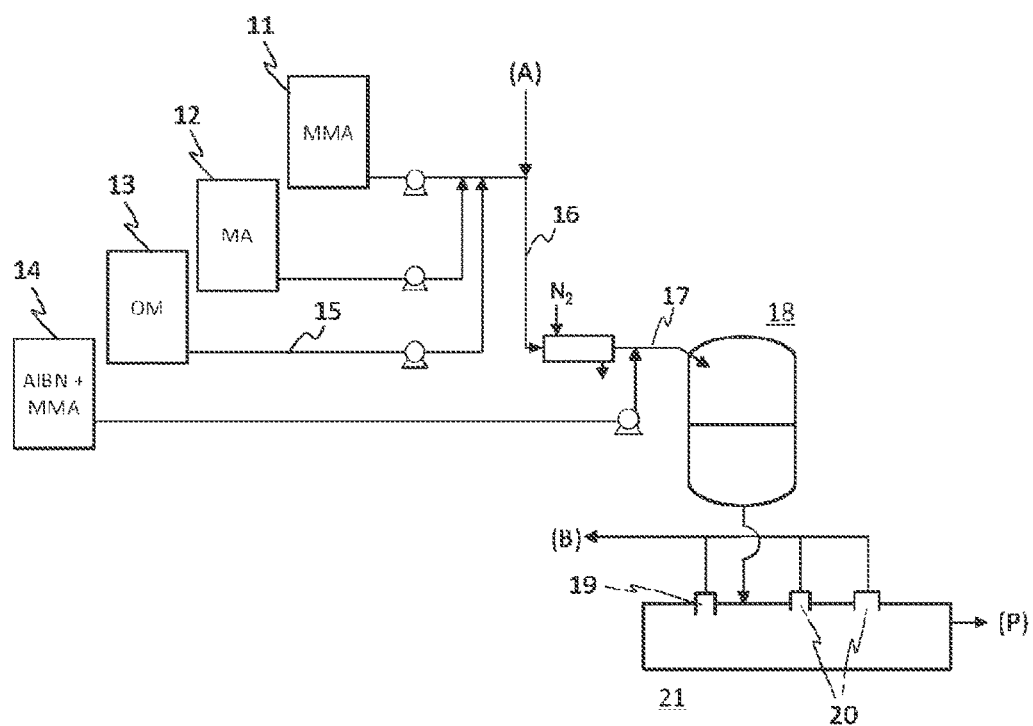

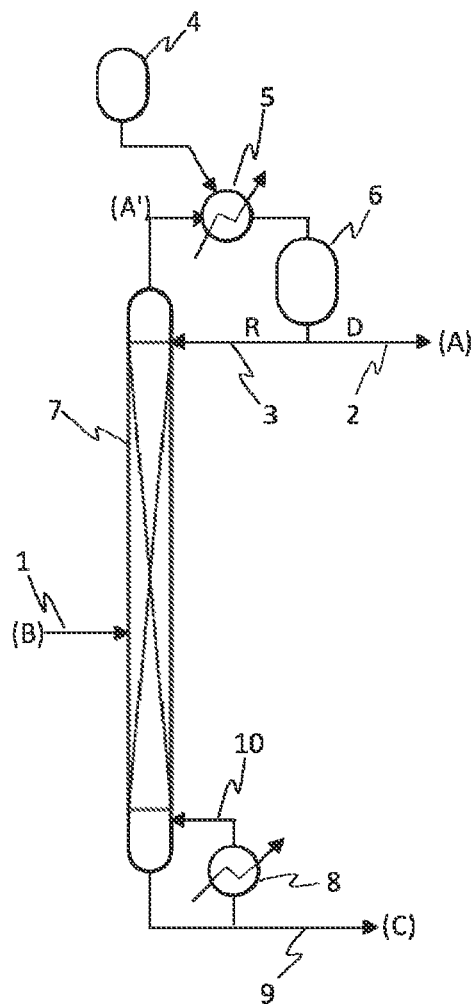
[FIG.2]

PROCESS FOR PRODUCING (METH)ACRYLIC RESIN COMPOSITION

This application is a national stage of PCT International Application No. PCT/JP2015/086224, filed on Dec. 25, 2015, which claims priority to and incorporates by reference the entire contents of Japanese Patent Application No. 2014-264809 filed in Japan on Dec. 26, 2014.

TECHNICAL FIELD

The present invention relates to a method for producing a (meth)acrylic resin composition. More specifically, the present invention relates to a method for long term continuous production of a (meth)acrylic resin composition with excellent optical properties without causing troubles such as line clogging and the like.

BACKGROUND ART (Meth)acrylic resin compositions have excellent transparency and low optical distortion and are therefore used in production of optical members such as lenses, prisms, retardation films, light guide plates, light diffuser films, polarizer plate protective films.

There have been developed various methods for producing (meth)acrylic resin compositions for optical members. For example, Patent Document 1 discloses a method comprising continuously feeding a recycled liquid containing a monomer component mainly comprised of unreacted methyl methacrylate recovered after polymerization as well as a monomer component mainly comprised of fresh methyl methacrylate to a distillation column, continuously feeding the resulting distilled monomer components into a polymerization reactor for bulk polymerization, subsequently devolatizing the resulting liquid containing a polymerization product to recover the polymerization product and simultaneously recovering as unreacted monomer for use as the recycled liquid, and feeding a solvent having a boiling point higher than the boiling points of the monomers to the bottom of the distillation column and simultaneously discharging, from the bottom, a liquid in the same amount as that of the solvent being fed.

Patent Document 2 discloses a method comprising continuously feeding a monomer component mainly comprised of methyl methacrylate to a polymerization reactor for bulk polymerization, subsequently devolatizing the resulting liquid containing a polymerization product to recover the polymerization product and simultaneously recovering an unreacted monomer for recycling, and removing an acidic substance present in the system by using a basic anionic exchange resin.

Patent Document 3 discloses a method comprising continuously feeding a monomer component mainly comprised of methyl methacrylate to a polymerization reactor for bulk polymerization, subsequently conducting devolatizing treatment of the resulting liquid containing a polymerization product to separate an unreacted monomer, introducing the separated unreacted monomer to a distillation column, and conducting distillation under reduced pressure so that the content of methyl methacrylate dimer reaches 0.1 to 1.0% by mass to recover the monomer.

CITATION LIST

Patent Literatures

Patent Document 1: JP H10-087736 A
Patent Document 2: JP H10-087705 A
Patent Document 3: JP 2005-082687 A

SUMMARY OF THE INVENTION

Problems to be Solved by the Invention

In these methods proposed by these patent documents, methyl methacrylate undergoes self-polymerization during recovery and thereby polymers adhere to distillation column, condenser, piping, tank and the like, potentially causing troubles such as line clogging and the like. Therefore, it is difficult for these methods to conduct stable long term continuous production.

An object of the present invention is to provide a method for long term continuous production of a (meth)acrylic resin composition with excellent optical properties without causing troubles such as line clogging and the like.

Means for Solving the Problems

Researches have been conducted to attain the object, resulting in achieve the present invention including the following aspects.

[1] A method for producing a (meth)acrylic resin composition, the method comprising continuously feeding a polymerizable monomer component comprising 50 to 100% by mass of methyl methacrylate, 0 to 20% by mass of an acrylic acid alkyl ester and 0 to 30% by mass of an additional monomer, a chain transfer agent, and a radical polymerization initiator to a tank reactor;

conducting bulk polymerization of the polymerizable monomer component at a polymerization conversion ratio of 40 to 70% by mass to obtain a liquid containing a (meth)acrylic resin;

continuously feeding the resulting liquid to a vented extruder to separate a volatile component from the (meth)acrylic resin;

continuously feeding the separated volatile component to a distillation column to obtain a fraction containing methyl methacrylate;

adding a polymerization inhibitor to the resulting fraction; and reusing the fraction containing the polymerization inhibitor as part of the polymerizable monomer component.

[2] The method according to [1], further comprising refluxing a portion of the fraction containing the polymerization inhibitor to the distillation column.

[3] The method according to [1] or [2], wherein a content of the polymerization inhibitor in the fraction containing the polymerization inhibitor is 1 to 20 ppm.

[4] The method according to any one of [1] to [3], wherein the polymerization inhibitor to be added to the fraction is in a state dissolved in methyl methacrylate.

[5] The method according to any one of [1] to [4], further comprising condensing the fraction obtained in the distillation column using a condenser, wherein the addition of the polymerization inhibitor is conducted in the condenser.

Advantageous Effects of the Invention

According to the production method of the present invention, a (meth)acrylic resin composition with excellent optical properties can be obtained by long term continuous production without causing troubles such as line clogging and the like.

BRIEF DESCRIPTION OF THE DRAWINGS

FIG. 1 an illustration of an example of an apparatus for conducting the polymerization step and the devolatization step in the production method according to the present invention.

FIG. 2 an illustration of an example of an apparatus for conducting the distillation step in the production method according to the present invention.

EMBODIMENTS FOR CARRYING OUT THE INVENTION

A method for producing a (meth)acrylic resin composition according to an embodiment of the present invention comprises continuously feeding a polymerizable monomer component comprising methyl methacrylate, optionally an acrylic acid alkyl ester, and optionally an additional monomer, a chain transfer agent, and a radical polymerization initiator to a tank reactor, subjecting a part of the polymerizable monomer component to bulk polymerization to obtain a liquid containing a (meth)acrylic resin, continuously feeding the resulting liquid to a vented extruder to separate a volatile component from the (meth)acrylic resin, continuously feeding the separated volatile component to a distillation column to obtain a fraction containing methyl methacrylate (hereinafter, sometimes called a fraction (A')), adding a polymerization inhibitor to the resulting fraction, and reusing the fraction containing the polymerization inhibitor (hereinafter, sometimes called a fraction (A)) as part of the polymerizable monomer component.

The polymerizable monomer component used in the present invention comprises methyl methacrylate as an essential component. The amount of methyl methacrylate is 50 to 100% by mass, preferably 80 to 100% by mass, more preferably 80 to 99.9% by mass, further preferably 80 to 96% by mass, relative to 100% by mass of the polymerizable monomer component.

Methyl methacrylate to be used in the polymerizable monomer component comprises a virgin methyl methacrylate (1) not yet undergone polymerization reaction, a methyl methacrylate (1') contained in the fraction (A), and a methyl methacrylate (1") optionally used as a solvent for a polymerization initiator (4). Therefore, the amount of methyl methacrylate being fed to the tank reactor is equal to the total amount of the methyl methacrylate (1), the methyl methacrylate (1') and the methyl methacrylate (1"). The amount of the methyl methacrylate (1) being fed is determined based on information including the amount of the fraction (A) being fed, the proportion of the methyl methacrylate (1') in the fraction (A), the amount of a solution of the polymerization initiator (4) in methyl methacrylate being fed, and the proportion of the methyl methacrylate (1") in the solution of the polymerization initiator (4) in methyl methacrylate.

The polymerizable monomer component used in the present invention comprises the acrylic acid alkyl ester as an optional component. The amount of the acrylic acid alkyl ester is 0 to 20% by mass, preferably 0.1 to 20% by mass, further preferably 4 to 20% by mass, relative to 100% by mass of the polymerizable monomer component.

The acrylic acid ester to be used in the polymerizable monomer component comprises a virgin acrylic acid alkyl ester (2) not yet undergone polymerization reaction and an acrylic acid alkyl ester (2') contained in the fraction (A). Therefore, the amount of the acrylic acid alkyl ester being fed to the tank reactor is equal to the total amount of the acrylic acid alkyl ester (2) and the acrylic acid alkyl ester (2'). The amount of the acrylic acid alkyl ester (2) being fed is determined based on information including the amount of the fraction (A) being fed and the proportion of the acrylic acid alkyl ester (2') in the fraction (A).

Examples of the acrylic acid alkyl ester (2) or (2') can include methyl acrylate, ethyl acrylate, propyl acrylate, butyl acrylate, 2-ethylhexyl acrylate, and the like. Among these, methyl acrylate preferable.

The polymerizable monomer component used in the present invention comprises, as an optional component, an additional monomer except for methyl methacrylate or acrylic acid alkyl ester. The amount of the additional monomer is 0 to 30% by mass, preferably 0 to 15% by mass, further preferably 0 to 5% by mass, relative to 100% by mass of the polymerizable monomer component.

The additional monomer to be used in the polymerizable monomer component comprises a virgin additional monomer (5) not yet undergone polymerization reaction and an additional monomer (5') contained in the fraction (A). Therefore, the amount of the additional monomer being fed to the tank reactor is equal to the total amount of the additional monomer (5) and the additional monomer (5'). The amount of the additional monomer (5) being fed is determined based on information including the amount of the fraction (A) being fed and the proportion of the additional monomer (5') in the fraction (A).

Examples of the additional monomer (5) or (5') can include vinyl monomers having one polymerizable alkenyl group in one molecule, for example, methacrylic acid alkyl esters except for methyl methacrylate, such as ethyl methacrylate, butyl methacrylate and the like; methacrylic acid aryl esters such as phenyl methacrylate and the like; methacrylic acid cycloalkyl esters such as cyclohexyl methacrylate, norbornenyl methacrylate and the like; acrylic acid aryl esters such as phenyl acrylate and the like; acrylic acid cycloalkyl esters such as cyclohexyl acrylate, norbornenyl acrylate and the like; aromatic vinyl monomers such as styrene, α-methylstyrene and the like; acrylamide; methacrylamide; acrylonitrile; methacrylonitrile; and the like.

Each of the methyl methacrylate, the acrylic acid alkyl ester, and the additional monomer has a b* value of preferably −1 to 2, more preferably −0.5 to 1.5. The b* value within this range is advantageous because the resulting (meth)acrylic resin composition efficiently gives a shaped product having little discoloration. The b* value is a value measured in accordance with the standard defined by the International Commission on Illumination (CIE) (1976) or JIS Z-8722.

The chain transfer agent used in the present invention comprises a virgin chain transfer agent (3) not yet undergone polymerization reaction and a chin transfer agent (3') contained in the fraction (A). Therefore the amount of the chain transfer agent being fed to the tank reactor is equal to the total amount of the chain transfer agent (3) and the chain transfer agent (3'). The amount of the chain transfer agent (3) being fed is determined based on information including the amount of the fraction (A) being fed and the proportion of the chain transfer agent (3') in the fraction (A).

The amount of the chain transfer agent being fed is determined so that the (meth)acrylic resin produced by polymerization reaction can have a desired molecular weight or a desired molecular weight distribution. More specifically, the amount of the chain transfer agent being fed is preferably 0.1 to 1 part by mass, more preferably to 0.2 to 8 part by mass, further preferably 0.3 to 0.6 part by mass, relative to 100 parts by mass of the amount of the polymerizable monomer component being fed.

Examples of the chain transfer agent used in the present invention can include alkylmercaptans such as n-octyl mercaptan, n-dodecyl mercaptan, t-dodecyl mercaptan, 1,4-butanedithiol, 1,6-hexanedithiol ethylene glycol bisthiopropionate, butanediol bisthioglycolate, butanediol bisthiopropionate, hexanediol bisthioglycolate, hexanediol bisthiopropionate, trimethylolpropane tris-(β-thiopropionate), pentaerythritol tetrakisthiopropionate and the like; α-methylstyrene dimer; terpinolene; and the like. Among these, monofunctional alkylmercaptans such as n-octyl mercaptan and n-dodecyl mercaptan are preferable. The chain transfer agent can be used alone or in combination of two or more.

In the mixture comprised of a predetermined proportion of the polymerizable monomer component (comprising the methyl methacrylate, the optional acrylic acid alkyl ester, and the optional additional monomer) and the chain transfer agent being continuously fed to the tank reactor, the dissolved oxygen level is preferably not more than 10 ppm, more preferably not more than 5 ppm, further preferably not more than 4 ppm, most preferably not more than 3 ppm. When the dissolved oxygen level is within this range, polymerization reaction proceeds smoothly and a shaped product having no silver streak or no discoloration tends to be obtained. The dissolved oxygen level can be regulated by nitrogen purge, for example.

The radical polymerization initiator used in the present invention comprises a virgin radical polymerization initiator (4) not yet undergone polymerization reaction. During polymerization reaction, all of the polymerization initiator are practically exhausted. When the radical polymerization initiator has a very long half life, the volatile component may contain the radical polymerization initiator remaining therein. By addition of the polymerization inhibitor to the fraction (A'), the remaining radical polymerization initiator is completely inactivated.

The amount of the radical polymerization initiator being fed is preferably 0.0001 to 0.02 part by mass, more preferably 0.001 to 0.01 part by mass, relative to 100 parts by mass of the amount of the polymerizable monomer component being fed. The radical polymerization initiator used in the present invention, when in a solid state, is preferably dissolved in a liquid medium before being fed into the tank reactor. As the liquid medium, methyl methacrylate can be preferably employed. As described above, the feed amount of the solution of the radical polymerization initiator (4) in methyl methacrylate and the proportion of the methyl methacrylate (1″) in the solution of the radical polymerization initiator (4) in methyl methacrylate are used as part of the information for use in determining the amount of the methyl methacrylate (1) being fed.

The radical polymerization initiator used in the present invention has a half-life period of preferably 0.5 to 120 seconds, more preferably 2 to 60 seconds, at a temperature inside the tank reactor, that is, the temperature of the liquid contained in the tank reactor. The radical polymerization initiator used in the present invention has a hydrogen abstraction ability of preferably not more than 40%, more preferably not more than 30%.

As the radical polymerization initiator used in the present invention, mentioned can be, for instance, t-hexylperoxy isopropyl monocarbonate, t-hexylperoxy 2-ethylhexanoate, 1,1,3,3-tetramethylbutylperoxy 2-ethylhexanoate, t-butylperoxy pivalate, t-hexylperoxy pivalate, t-butylperoxy neodecanoate, t-hexylperoxy neodecanoate, 1,1,3,3-tetramethylbutylperoxy neodecanoate, 1,1-bis(t-hexylperoxy) cyclohexane, benzoyl peroxide, 3,5,5-trimethylhexanoyl peroxide, lauroyl peroxide, 2,2'-azobis(2-methylpropionitrile), 2,2'-azobis(2-methylbutyronitrile), dimethyl 2,2'-azobis(2-methylpropionate), and the like. Among these, t-hexylperoxy 2-ethyl hexanoate, 1,1-bis(t-hexylperoxy) cyclohexane, and dimethyl 2,2'-azobis(2-methylpropionate) can be preferably used. The radical polymerization initiator can be used alone or in combination of two or more.

The hydrogen abstraction ability can be found, for example, in Technical data from the manufacturer of the polymerization initiator (for example, Technical data from Nippon Oil & Fats Co., Ltd. "Hydrogen abstraction ability and efficiency as initiator of organic peroxides" (prepared on April, 2003)), or can be determined by the radical trapping method using an α-methylstyrene dimer, in other words, by the α-methylstyrene dimer trapping method. The determination is generally carried out as follows. First, in the presence of an α-methylstyrene dimer serving as a radical-trapping agent, the polymerization initiator is cleaved into radical fragments. Among the resulting radical fragments, a radical fragment having a low hydrogen abstraction ability adds to and is trapped by a double bond of an α-methylstyrene dimer, while a radical fragment having a high hydrogen abstraction ability abstracts hydrogen from cyclohexane to generate a cyclohexyl radical, which adds to and is trapped by a double bond of an α-methylstyrene dimer to generate a cyclohexane-trapped product. Then, the cyclohexane or the cyclohexane-trapped product is quantitatively assessed, and the resulting value is used to determine the ratio (molar fraction) of the amount of radical fragments having a high hydrogen abstraction ability to the theoretical amount of radical fragments generated. The resulting ratio serves as the hydrogen abstraction ability.

Although no solvent is used in bulk polymerization as a general rule, when it is necessary to regulate the viscosity of the liquid contained in the tank reactor, for example, a solvent can be comprised in a reaction starting material. As the solvent, an aromatic hydrocarbon such as benzene, toluene, ethylbenzene and the like is preferable. The solvent can be used alone or in combination of two or more. The amount of the solvent is preferably not more than 30 parts by mass, more preferably not more than 10 parts by mass, relative to 100 parts by mass of the polymerizable monomer component.

The tank reactor used in the present invention usually has a stirring means for stirring the liquid contained in the tank reactor, an inlet through which the polymerizable monomer component, the chain transfer agent and the polymerization initiator are fed into the tank reactor, and an outlet through which the liquid containing a (meth)acrylic resin is discharged from the tank reactor. In the present invention, the amount of the liquid being fed into the tank reactor is balanced with the amount of the liquid discharged from the tank reactor so that the amount of the liquid contained in the tank reactor is maintained approximately constant. The amount of the liquid contained in the tank reactor is preferably not less than ¼, more preferably ¼ to ¾, and further preferably ⅓ to ⅔ the capacity of the tank reactor.

In the tank reactor used in the present invention, the inlet may be provided in the top surface of the tank reactor, or may be provided in the side surface of the tank reactor, or may be provided in the bottom surface of the tank reactor. The inlet may be provided at a height higher than the liquid level in the tank reactor or may be provided at a height lower than the liquid level in the tank reactor. The inlet may have the shape of the actual cut end of a round tube, or may have such a shape that the polymerizable monomer component and the like are widely sprinkled onto the liquid surface in the tank reactor.

Examples of the stirring means can include a Maxblend stirring device, a lattice-blade-type stirring device, a propeller-driven stirring device, a screw stirring device, a helical-ribbon-type stirring device, a paddle-type stirring device, and the like. Among these, a Maxblend stirring device is preferable in terms of homogeneous mixing.

The temperature inside the tank reactor, namely, the temperature of the liquid contained in the tank reactor is preferably 100 to 170° C., more preferably 110 to 160° C., further preferably 115 to 150° C. The liquid temperature can be controlled, for example, by external heat exchange using a jacket, a heat exchanger tube, or the like, or by self heat exchange in which a tube is provided within the tank reactor so that the reaction starting materials or the (meth)acrylic resin flows through the tube.

It is preferable that the fraction (A), the methyl methacrylate (1), the acrylic acid alkyl ester (2), the additional monomer (5), the chain transfer agent (3), and the radical polymerization initiator (4) have been mixed together by the time immediately before they reach the inlet of the tank reactor. The reaction starting materials except for the radical polymerization initiator are preferably handled in an inert atmosphere such as in nitrogen gas. In order to conduct the continuous-flow operation smoothly, it is preferable to continuously feed each reaction starting material respectively from the tank storing the component through a tube to a mixer located upstream of the tank reactor, while mixing, and then feed the resulting mixture continuously to the tank reactor. The mixer can be equipped with a dynamic stirrer or a static stirrer.

The mean residence time of the liquid in the tank reactor is preferably 0.5 to 6 hours, more preferably 1 to 5 hours, further preferably 2 to 4 hours. When the mean residence time is too short, the amount of the polymerization initiator required is great. When the amount of the polymerization initiator is great, the polymerization reaction tends to be difficult to control and the molecular weight tends to be difficult to control. On the other hand, when the mean residence time is too long, it tends to take long until the reaction reaches a steady state and productivity tends to be low. The mean residence time can be regulated by selecting the capacity of the tank reactor and the amounts of the reaction starting materials being fed.

The bulk polymerization in the present invention is preferably performed until the polymerization conversion ratio reaches 40 to 70% by mass, preferably 35 to 65% by mass.

The water content of the liquid contained in the tank reacts preferably not more than 1000 ppm, more preferably not more than 700 ppm, further preferably not more than 280 ppm. The water content can be regulated by, for example, conducting dehydration treatment of the polymerizable monomer component by means of an adsorption tower or the like before feeding to the tank reactor. When the water content is not more than 1000 ppm, a resin contaminant having a size of several micrometers to several dozen micrometers can be inhibited from producing during polymerization reaction, and consequently when the resulting (meth)acrylic resin composition is subjected to melt formation, the resulting film or sheet can have a significantly reduced number of blemishes having an outer diameter of several dozen micrometers attributable to the resin contaminant that serves as a nucleus.

Although the mechanism by which the producing of the resin contaminant is thus inhibited is not clear, it is presumed that a (meth)acrylic resin having a high molecular weight may be generated in the gas phase within the tank reactor, get mixed as a resin contaminant, remain unmelted during melt formation, and act as a nucleus to form a blemish. As a method for inhibiting this reaction from occurring in the gas phase, mentioned are the method for reducing the water content, and a method comprising introducing an inert gas into the gas phase within the tank reactor so that mist of the polymerizable monomer component and the like is entrained in the inert gas, condensed in a condenser of a brine cooler, and discharged out of the system.

Downstream of the tank reactor, an additional reactor may be provided. The reactor that may be provided downstream may be a tank reactor or a tube reactor. The downstream reactor can allow the bulk polymerization to further proceed and can increase the polymerization conversion ratio to a desired value.

The liquid containing a (meth)acrylic resin thus obtained by the bulk polymerization is continuously discharged from the tank reactor (or from the additional reactor provided downstream, if any). The amount being discharged from the reactor is preferably balanced with the amount being fed into the reactor so that the amount of the liquid contained in the reactor is maintained constant.

The liquid discharged from the reactor contains the (meth)acrylic resin and the volatile component. The amount of the (meth)acrylic resin contained in the liquid is preferably 40 to 70% by mass, more preferably 35 to 65% by mass. This amount is substantially the same as the polymerization conversion ratio. When the content of the (meth)acrylic resin is high, the viscosity of the liquid contained in the reactor rises and stirring force required tends to be great. When the content of the (meth)acrylic resin is low, removal of the volatile component requires great thermal energy to be applied. When the applied thermal energy is insufficient and thereby removal of the volatile component proceeds insufficiently, the resulting shared product tends to have defective appearance such as silver streak or the like.

The (meth)acrylic resin has a weight average molecular weight (hereinafter, sometimes abbreviated as Mw) of preferably thirty five thousand to two hundred thousand, more preferably forty thousand to one hundred fifty thousand, further preferably forty five thousand to one hundred thirty thousand. When Mw is extremely low, a shaped product resulting from the (meth)acrylic resin composition tends to have poor impact resistance and poor toughness. When Mw is extremely high, the fluidity of the (meth)acrylic resin composition tends to be low and forming processability tends to be low.

The (meth)acrylic resin has a ratio of (weight average molecular weight)/(number average molecular weight) (hereinafter, this ratio is sometimes expressed as the molecular weight distribution) of preferably 1.5 to 2.6, more preferably 1.6 to 2.3, particularly preferably 1.7 to 2.0. When the molecular weight distribution is low, forming processability of the (meth)acrylic resin composition tends to be poor. When the molecular weight distribution is high, a shaped product resulting from the (meth)acrylic resin composition tends to have poor impact resistance and be brittle.

The weight average molecular weight and the number average molecular weight are the molecular weights in terms of standard polystyrene determined by GPC (gel permeation chromatography). The weight average molecular weight and the molecular weight distribution of the (meth)acrylic resin can be controlled by selecting, for example, the kinds and the amounts of the polymerization initiator and the chain transfer agent.

The liquid continuously discharged from the reactor is preferably heated with a heat exchanger. As a heat source of the heat exchanger, steam generated with a boiler or another device can be used. Alternatively, vapor of the volatile component discharged from a vented extruder can also be used as the heat source. For enhancing efficiency in flash evaporation, the liquid can be applied pressure with a pump or the like.

Then, the heated liquid is continuously fed to the vented extruder. A typical vented extruder has an inlet through which the liquid containing a polymer and the volatile component is fed, an outlet through which the separated polymer is discharged, at least one vent through which the separated volatile component is discharged, and a screw for transferring the polymer from the inlet to the outlet while kneading. At least one vent closer to the outlet than the inlet is called a front vent, and at least one vent farther from the outlet than the inlet is called a rear vent. The vented extruder used in the present invention may be equipped with an additive inlet at a position that is closer to the outlet than the front vent closest to the outlet.

It is preferable that the interior of the extruder is under reduced pressure for subjecting the liquid fed into the extruder to flash evaporation near the inlet.

As the liquid fed is transferred by the screw within the extruder, the volatile component evaporates. A volatile component (B) thus evaporated is discharged through at least one of the vents. The extruder may be a single-screw extruder or a twin screw extruder, for example. A typical screw has different zones, namely, a feed zone, a compression zone, a metering zone, and a mixing one, but the screw of the present invention is not particularly limited thereto. In the mixing zone, an appropriate combination of screws of various shapes having projections and depressions, grooves, and pins, such as for instance a Dulmage-type screw, a rotor-type screw and a flute-mixing-type screw can be used.

The extruder can be equipped with a breaker plate or a screen, for example, positioned at the outlet so as to remove foreign substances, carbonized matter, gel-like matter, and the like. The breaker plate is typically a disc having a number of pores having a diameter of 3 mm to 4 mm provided in a concentric arrangement. The screen is one or several metal meshes stacked together that have various aperture designs selected in accordance with the application and the purpose. To the (meth)acrylic resin prior to be extruded through the outlet, additives described below can be added through the additive inlet. A (meth)acrylic resin composition (P) obtained in this way can be made into a pellet form as well as into a powder or grain form by a known method, for ease of handling of it as a forming material. The amount of the volatile component remaining in the (meth)acrylic resin composition obtained in the present invention is preferably not more than 1% by mass, more preferably not more than 0.5% by mass. When the amount of the remaining volatile component is high, the resulting shaped product tends to have defective appearance such as silver streak and the like.

The volatile component (B) discharged through the vents is continuously fed to the distillation column. The distillation column used in the present invention may be either a plate column or a packed column. The theoretical plate number of the distillation column is preferably 6 to 20. The volatile component is usually fed to an intermediate plate of the distillation column. So as to regulate the temperature of the volatile component to be equal to the temperature of the intermediate plate on which the inlet is provided, a heat exchanger is preferably provided upstream of the inlet.

The volatile component sometimes contains a dimer or a trimer in addition to an unreacted monomer such as methyl methacrylate and the like. The dimer or the trimer may affect the properties of the (meth)acrylic resin and therefore is preferably removed with the distillation column.

In a typical distillation column, a fraction with a low boiling point is discharged from the top of the column through distillation and a fraction with a high boiling point is discharged from the bottom of the column. In the present invention, it is preferable that the fraction (A') containing methyl methacrylate and the like is discharged from the top of the column through distillation and a fraction (B) containing a dimer, a trimer, and the like is discharged from the bottom of the column. The fraction (A') may contain an acrylic acid alkyl ester or an additional monomer in addition to methyl methacrylate.

The fraction (A') discharged from the top of the column through distillation is usually in a vapor state and therefore can be condensed with a condenser 5. Part of this fraction can be refluxed. Typically, refluxing is conducted by feeding a condensed liquid to the liquid phase present on the uppermost plate in the distillation column. The reflux ratio is not particularly limited but is preferably 0.4 to 2.0. The reflux ratio is represented as (R as the amount being refluxed)/(D as the amount being discharged through distillation). The apparatus shown in FIG. 2 can temporarily store the condensed fraction in a tank 6 and then divide the condensed fraction into a portion to flow through a reflux tube R and a portion to flow through a distillation tube D, respectively, and can regulate a reflux ratio with a flow control valve (not shown).

In the present invention, the polymerization inhibitor is added to the fraction (A'). Addition of the polymerization inhibitor is preferably conducted in the condenser 5, which is provided for condensing the fraction (A'). The temperature of the fraction (A') being discharged from the top of the column through distillation and being fed to the condenser 5 is high and therefore a monomer contained in the fraction (A') may easily undergo polymerization reaction. The condenser 5 has many narrow channels such as a heat exchanger tube. As the polymerization reaction proceeds, the resulting polymer may block the channels in the condenser. Addition of the polymerization inhibitor to the condenser can prevent polymerization reaction from occurring in the condenser. The polymerization inhibitor also flows into the distillation column through refluxing and can thereby also prevent polymerization reaction from occurring in the distillation column. When the polymerization inhibitor is added in a state dissolved in methyl methacrylate having a low temperature as described below, the fraction (A') is cooled and therefore the cooling efficiency increases.

Examples of the polymerization inhibitor can include nitroso compounds such as nitrosobenzene, methyl-α-nitrosoisopropyl ketone, N-nitrosophenylhydroxylamine aluminum salt, N-nitrosophenylhydroxyamine ammonium salt and the like; nitrone compounds such as phenyl-t-butylnitrone and the like; quinones such as hydroquinone, p-benzoquinone, 2,5-dichloro-p-benzoquinone, 2,6-dichloro-p-benzoquinone, t-butylhydroquinone, tetrachloro-p-benzoquinone and the like; nitro compounds such as dinitrobenzene, 1,3,5-trinitrobenzene, 1,3,5-trinitrotoluene and the like; nitrophenols such as nitrophenol, dinitrophenol, trinitrophenol and the like; butylxylenol, p-methoxyphenol, N,N-diethylhydroxylamine, iron(III) chloride, diphenylpicrylhydrazyl, furfurylidene malononitrile, oxygen, sulfur; and the like. The polymerization inhibitor may be added as it is but is preferably added after dissolved in methyl methacrylate. In the apparatus shown in FIG. 2, a solution of the polymerization inhibitor in methyl methacrylate can be prepared in a tank 4 and fed to the condenser 5.

The amount of the polymerization inhibitor added in the fraction (A) is not particularly limited but is preferably 1 to 20 ppm, more preferably 1 to 10 ppm.

As described above, the fraction (A) contains methyl methacrylate and the optional acrylic acid alkyl ester or the optional additional monomer thereof and therefore can be reused as part of the polymerizable monomer component.

The b* value of the fraction (A) is preferably −1 to 2, more preferably −0.5 to 1.5. The b* value within this range is advantageous because the resulting (meth)acrylic resin composition efficiently gives a shaped product having little discoloration. The b* value is a value as measured in accordance with the standard defined by the International Commission on Illumination (CIE) (1976) or JIS Z-8722.

As additives that can be added to the (meth)acrylic resin, mentioned can be an antioxidant, a thermal degradation inhibitor, an ultraviolet absorber, a light stabilizer, a lubricant, a mold release agent, a polymer processing aid, an antistatic agent, a flame retardant, a dye and a pigment, a light dispersing agent, an organic coloring agent, a delustering agent, an impact resistance modifier, a fluorescent substance, and the like. The amounts of the additives are preferably not more than 0.5% by mass, more preferably not more than 0.2% by mass, relative to the amount of the (meth)acrylic resin composition. When the amounts of the additives are extremely large, a shaped product may have defective appearance such as silver streak.

The antioxidant by itself has an effect to prevent oxidative degradation of a resin from being caused in the presence of oxygen. Examples of the antioxidant can include phosphorus antioxidants, hindered phenol antioxidants, thioether antioxidants and the like. The antioxidant can be used alone or in combination of two or more. Among these, from the viewpoint of the effect to prevent optical properties from being impaired due to discoloration, phosphorus antioxidants or hindered phenol antioxidants are preferable, and concurrent use of a phosphorus antioxidant and a hindered phenol antioxidant is more preferable.

When a phosphorus antioxidant and a hindered phenol antioxidant are concurrently used, the proportion therebetween is not particularly limited but is preferably 1/5 to 2/1, more preferably 1/2 to 1/1, in terms of a mass ratio of the phosphorus antioxidant to the hindered phenol antioxidant.

As the phosphorus antioxidant, 2,2-methylenebis(4,6-di-t-butylphenyl)octyl phosphite (manufactured by Asahi Denka, trade name: ADK STAB HP-10), and tris(2,4-di-t-butylphenyl)phosphite (manufactured by Ciba Specialty Chemicals, trade name: IRGAFOS 168) are preferable, for example.

As the hindered phenol antioxidant, pentaerythrityl-tetrakis[3-(3,5-di-t-butyl-4-hydroxy phenyl)propionate] (manufactured by Ciba Specialty Chemicals, trade name: IRGANOX 1010) and octadecyl-3-(3,5-di-t-butyl-4-hydroxyphenyl)propionate (manufactured by Ciba Specialty Chemicals, trade name: IRGANOX 1076) are preferable, for example.

The thermal degradation inhibitor can trap a polymer radical that is generated at high heat in the practical absence of oxygen and therefore can prevent thermal degradation of the resin.

As the thermal degradation inhibitor, 2-t-butyl-6-(3'-t-butyl-5'-methyl-hydroxybenzyl)-4-methylphenyl acrylate (manufactured by Sumitomo Chemical Company, Limited, trade name: SUMILIZER GM) and 2,4-di-t-amyl-6-(3',5'-di-t-amyl-2'-hydroxy-α-methylbenzyl)phenyl acrylate (manufactured by Sumitomo Chemical Company, Limited, trade name: SUMILIZER GS) are preferable, for example.

The ultraviolet absorber is a compound capable of absorbing ultraviolet rays. The ultraviolet absorber is a compound known to have a primary function of converting light energy into thermal energy.

As the ultraviolet absorber, mentioned can be benzophenones benzotriazoles, triazines, benzoates, salicylates, cyanoacrylates, oxalic anilides, malonic acid esters, formamidines, and the like. The ultraviolet absorber can be used alone or in combination of two or more.

Preferable among these are benzotriazoles, or ultraviolet absorbers having a maximum molar absorption coefficient, $\epsilon_{max}$, at a wavelength of 380 to 450 nm of not more than 1200 $dm^3 \cdot mol^{-1}$ $cm^{-1}$.

Benzotriazoles effectively inhibit optical properties from being impaired due to, for example, discoloration caused by ultraviolet exposure, and therefore are preferable as an ultraviolet absorber used when the (meth)acrylic resin composition is used in applications where such properties are required.

As the benzotriazoles, 2-(2H-benzotriazol-2-yl)-4-(1,1,3,3-tetramethylbutyl)phenol (manufactured by Ciba Specialty Chemicals, trade name: TINUVIN 329) and 2-(2H-benzotriazol-2-yl)-4,6-bis(2-methyl-1-phenylethyl) phenol (manufactured by Ciba Specialty Chemicals, trade name: TINUVIN 234) are preferable, for example.

The ultraviolet absorbers having a maximum molar absorption coefficient, $\epsilon_{max}$, at a wavelength of 380 to 450 nm of not more than 1200 $dm^3 \cdot mol^{-1}$ $cm^{-1}$ can inhibit yellowing of the resulting shaped product.

The maximum molar absorption coefficient, $\epsilon_{max}$, of the ultraviolet absorber is measured as follows. To 1 L of cyclohexane, 10.00 mg of the ultraviolet absorber is added and dissolved until no undissolved matter is visually observed. The resulting solution is poured into a quartz glass cell of 1 cm×1 cm×3 cm and the absorbance at a wavelength of 380 to 450 nm is measured using a U-3410 spectrophotometer manufactured by Hitachi, Ltd. Using the molecular weight (Mw) of the ultraviolet absorber and the maximum absorbance ($A_{max}$) thus measured, the maximum molar absorption coefficient, $\epsilon_{max}$, is calculated by formula:

$$\epsilon_{max} = [A_{max}/(10 \times 10^{-3})] \times Mw$$

Examples of the ultraviolet absorbers having a maximum molar absorption coefficient, $\epsilon_{max}$, at a wavelength of 380 to 450 nm of not more than 1200 $dm^3 \cdot mol^{-1}$ $cm^{-1}$ can include 2-ethyl-2'-ethoxy-oxalic anilide (manufactured by Clariant Japan K.K., trade name: Sanduvor VSU) and the like.

Among these ultraviolet absorbers, from the viewpoint that degradation of the resin caused by ultraviolet exposure is inhibited, benzotriazoles are preferably used.

The light stabilizer is a compound that is known to have a primary function of trapping a radical generated by light oxidation. Preferable examples of the light stabilizer can include hindered amines such as compounds having a 2,2,6,6-tetraalkylpiperidine skeleton, and the like.

The mold release agent is a compound that has a function of facilitating release of a shaped product from a mold. Examples of the mold release agent can include higher alcohols such as cetyl alcohol, stearyl alcohol and the like; glycerol higher fatty acid esters such as stearic acid monoglyceride, stearic acid diglyceride and the like. As the mold release agent in the present invention, a higher alcohol and a glycerol fatty acid monoester are preferably used in combination. When a higher alcohol and a glycerol fatty acid monoester are used in combination, the proportion therebetween is not particularly limited but is preferably 2.5/1 to 3.5/1, more preferably 2.8/1 to 3.2/1, in terms of the mass ratio of the higher alcohol to the glycerol fatty acid monoester.

The polymer processing aid is a compound that effectively achieves an accurate thickness and gives a thin film when forming a (meth)acrylic resin composition. The polymer processing aid is usually a polymer particle with a particle diameter of 0.05 to 0.5 μm that can be produced by the emulsion polymerization method.

Such a polymer particle may be a monolayer particle of a polymer having a single composition ratio and a single limiting viscosity, or may be a multilayer particle of two or more polymers having different composition ratios or different limiting viscosities. Among these, preferable examples thereof can include particles having a two-layer structure where the inner layer is a polymer layer with a low limiting viscosity and the outer layer is a polymer layer with a high limiting viscosity of not less than 5 dl/g.

The polymer processing aid preferably has a limiting viscosity of 3 to 6 dl/q. When the limiting viscosity is extremely low, the effect to improve formability is low. When the limiting viscosity is extremely high, the melt fluidity of the (meth)acrylic resin composition tends to be low.

Examples of the impact resistance modifier that may be added to the (meth)acrylic resin composition can include core-shell modifiers containing acrylic rubber or diene rubber as a core layer component; modifiers containing a plurality of rubber particles; and the like.

Preferable as the organic coloring agent is a compound that has a function of converting ultraviolet light, which is thought to be harmful to a resin into visible light.

Examples of the light dispersing agent and the delustering agent can include glass microparticles, polysiloxane crosslinked microparticles, crosslinked polymer microparticles, talc, calcium carbonate, barium sulfate, and the like.

Examples of the fluorescent substance can include fluorescent pigments, fluorescent dyes, fluorescent white dyes, fluorescent brighteners, fluorescent bleaching agents, and the like.

The b* value of a shaped product obtained from the (meth)acrylic resin composition by the method of the present invention is preferably not more than 4, more preferably not more than 3.5, as measured at a temperature of 260° C. in terms of a length of 200 mm.

The (meth)acrylic resin composition obtained by the method of the present invention can be shaped (through heating and melting) by a conventionally-known formation method such as injection molding, compression molding, extrusion, vacuum forming or the like to produce various shaped products. As the shaped products formed from the (meth)acrylic resin composition, mentioned can be parts of signs such as advertising pillars, sign stands, projecting signs, door-top signs, and roof-top signs; display parts such as showcases, dividers, and store display parts; lighting fixture parts such as fluorescent lamp covers, mood lighting covers, lampshades, and parts of luminous ceilings, luminous walls, and chandeliers; parts of interior furnishings such as pendants and mirrors; building parts such as doors, domes, safety window panes, partitions, stair skirting boards, balcony skirting boards, and roofs of buildings for recreational use; carrier-related parts such as aircraft windshields, pilot visors, motorcycle windshields, motorboat windshields, visors for buses, side visors for automobiles, rear visors, head wings, and headlight covers; electronics parts such as nameplates for audiovisuals, stereo covers, television protection masks, and parts of vending machines; parts of medical equipment such as incubators and X-ray machines; parts related to instruments, such as machinery covers, gauge covers, parts of experiment instruments, rulers, dials, and view windows; optics-related parts such as protective plates for liquid crystal, light guide plates, light guide films, Fresnel lenses, lenticular lenses, front plates of various displays and light dispersing plates; traffic-related parts such as traffic signs, direction boards, traffic mirrors, and noise barrier walls; film parts such as protective films for polarizers, protective films for polarizer plates, retardation films, surface materials for automotive interior, surface materials of mobile phones, and marking films; appliance parts such as lid materials and control panels of washers and top panels of rice cookers; other items such as greenhouses, large aquariums and water tanks, box-shaped aquariums and water tanks, clock panels, bathtubs, sanitary wares, desk mats, gaming parts, toys, and welding masks for facial protection; and the like.

The present invention is described more specifically by the following Examples and Comparative Examples. The present invention is, however, not limited to these Examples.

Measurement of properties, for example, in Examples and Comparative Examples are carried out by the following methods.

(Polymerization Conversion Ratio)

To a gas chromatograph (GC-14A manufactured by Shimadzu Corporation), a column (CDC-G-230 manufactured by Sciences Inc., INERT CAP 1 (df=0.4 μm, I.D.=0.25 mm, length=60 m)) was attached. Analysis was performed under conditions where an injection temperature was 180° C., a detector temperature was 180° C., and a column temperature was raised from 60° C. to reach 200° C. at a temperature raising rate of 10° C./minute.

(b* Value)

Using an injection molding machine (M-100-DM manufactured by Meiki Co., Ltd.), a (meth)acrylic resin composition in a pellet form was subjected to injection molding at a cylinder temperature of 260° C., a mold temperature of 60° C., and a molding cycle of 2 minutes to produce a flat plate of 200-mm long, 60-mm wide, and 0.6-mm thick. The b* value of the resulting plate was measured in accordance with JIS Z 8729.

(Apparatus for Production)

An apparatus shown in FIG. 1 and FIG. 2 was used. Feeding of methyl methacrylate (MMA) and fraction (A) was performed using respective canned pumps. Downstream of these canned pumps, respective flow control valves were placed. Feeding of methyl acrylate (MA), n-octyl mercaptan (OM), and a solution of 2,2'-azobis 2-methylpropionitrile (AIBN) in methyl methacrylate (MMA) was performed with reciprocating pumps. On the discharging side to each pump, a mass flowmeter was placed. The materials, namely, the methyl methacrylate (MMA), the fraction (A), the methyl acrylate (MA), and the n-ocotyl mercaptan (OM) joined upstream of a tank reactor. Downstream of where they joined, a nitrogen blender as placed for removing dissolved oxygen. The solution of 2,2'-azobis 2-methylpropionitrile (AIBN) in methyl methacrylate (MMA) was designed to join a line 17 at a position downstream of the nitrogen blender and upstream of the tank reactor. The flow rate data obtained with the flowmeters was sent to an automatic controller, which transmitted command signals to the valves and the pumps to regulate the degrees of opening of the valves and the discharge pressures at the pumps so as to achieve the predetermined flow rates.

Example 1

Into a continuous-flow tank reactor (capacity: 0.1 m³, tank diameter: 500 mm, Maxblend blade, blade diameter: 260 mm, rotational speed: 200 rpm) equipped with a brine-cooling condenser, 73.6 kg of methyl methacrylate, 6.4 kg of methyl acrylate, and 360 g of n-octyl mercaptan were fed, followed by performing replacement with nitrogen and then raising the temperature to reach 140° C.

When the temperature reached 140° C., feeding to the tank reactor was started so as to achieve a proportion of 94 parts by mass of methyl methacrylate, 6 parts by mass of methyl acrylate, 0.35 part by mass of n-octyl mercaptan, and 0.0065 part by mass of 2,2'-azobis 2-methylpropionitrile and a mean residence time of 2.5 hours. Simultaneously, nitrogen gas was passed through a nitrogen blender to remove oxygen from the materials, namely, the methyl methacrylate, the methyl acrylate, and the n-octyl mercaptan. Simultaneously with the start of feeding of these materials, liquid was discharged from the bottom of the tank reactor so as to maintain a constant liquid level of the liquid within the tank reactor. The polymerization conversion ratio was 57%.

The liquid discharged from the tank reactor was fed into a heater, warmed to 230° C., and then continuously fed into a vented twin screw extruder that was controlled at 250° C. The twin screw extruder separated the volatile component (B) predominantly composed of an unreacted monomer, and also extruded a strand of a resin component (P). The strand was cut with a pelletizer, and a (meth)acrylic resin composition was obtained as a pellet.

The volatile component (B) separated with the use of the vented twin screw extruder was condensed with a heat exchanger and fed to a distillation column. The temperature at the bottom of the column was set at 125° C. From the bottom of the column, a fraction (C) having a high boiling point was continuously discharged. From the top of the column, the fraction (A') was discharged through distillation and condensed with the condenser 5. The solution of butylxylenol (polymerization inhibitor) in methyl methacrylate prepared in the tank 4 was continuously fed to the condenser 5 so as to achieve a concentration of the polymerization inhibitor in the fraction (A) of 3 ppm. The fraction (A) was fed from the tank 6 to both of the distillation column and the tank reactor with canned pumps in a way that the reflux ratio was 1. The flow rates of the fraction (A) were measured with mass flowmeters.

The apparatus was operated continuously for 1 year. No clogging occurred in a distillation column 7, the condenser 5, the tank 6, and the like during the 1-year operation. The average b* value of the resulting (meth)acrylic resin composition (P) was 2.0.

Comparative Example 1

A (meth)acrylic resin composition was produced in the same manner as in Example 1 except that no feeding of the solution of butylxylenol (polymerization inhibitor) in methyl methacrylate was conducted.

When 3 months passed after the start of the operation of the apparatus, clogging occurred in the distillation column 7, the condenser 5, the tank 6, and the like and therefore recovery of the fraction (A) was difficult. The average b* value of the resulting (meth)acrylic resin composition (P) was 2.0.

As described above, according to the method of the present invention, a (meth)acrylic resin composition having excellent optical properties can be continuously produced by long term continuous operation without causing troubles such as line clogging and the like.

EXPLANATION OF SYMBOLS

11: tank for storing MMA
12: tank for storing MA
13: tank for storing OM
14: tank for storing solution of AIBN in MMA
18: tank reactor
19: rear vent
20: front vents
21: vented extruder
1: feeding line
2: discharging-through-distillation line
3: reflux line
4: tank for storing solution of polymerization inhibitor in MMA
5: condenser
6: discharge-through-distillation tank
7: distillation column
8: reboiler

The invention claimed is:

1. A method for producing a (meth)acrylic resin composition, the method comprising:
   continuously feeding a polymerizable monomer component comprising 50 to 100% by mass of methyl methacrylate, 0 to 20% by mass of an acrylic acid alkyl ester and 0 to 30% by mass of an additional monomer, a chain transfer agent, and a radical polymerization initiator to a tank reactor;
   conducting bulk polymerization of the polymerizable monomer component at a polymerization conversion ratio of 40 to 70% by mass to obtain a liquid containing a (meth)acrylic resin;
   continuously feeding the liquid to a vented extruder to separate a volatile component from the (meth)acrylic resin;
   continuously feeding the separated volatile component to a distillation column to obtain a fraction containing methyl methacrylate;
   adding a polymerization inhibitor to the fraction, wherein an amount of the polymerization inhibitor added to the fraction is 1 to 10 ppm relative to the fraction; and
   reusing the fraction which contains the polymerization inhibitor as part of the polymerizable monomer component.

2. The method according to claim 1, further comprising refluxing part of the fraction which contains the polymerization inhibitor to the distillation column.

3. The method according to claim 1, wherein the polymerization inhibitor to be added to the fraction is in a state dissolved in methyl methacrylate.

4. The method according to claim 1, further comprising condensing the fraction obtained in the distillation column using a condenser, wherein the addition of the polymerization inhibitor is conducted in the condenser.

5. The method according to claim 1, wherein the polymerization inhibitor is butylxylenol.

6. The method according to claim 2, wherein the polymerization inhibitor to be added to the fraction is in a state dissolved in methyl methacrylate.

7. The method according to claim 2, further comprising condensing the fraction obtained in the distillation column using a condenser, wherein the addition of the polymerization inhibitor is conducted in the condenser.

8. The method according to claim 2, wherein the polymerization inhibitor is butylxylenol.

9. The method according to claim 3, further comprising condensing the fraction obtained in the distillation column using a condenser, wherein the addition of the polymerization inhibitor is conducted in the condenser.

10. The method according to claim 3, wherein the polymerization inhibitor is butylxylenol.

11. The method according to claim 4, wherein the polymerization inhibitor is butylxylenol.

12. The method according to claim 7, wherein the polymerization inhibitor to be added to the fraction is in a state dissolved in methyl methacrylate.

13. The method according to claim 7, wherein the polymerization inhibitor is butylxylenol.

* * * * *